United States Patent
Carter et al.

(10) Patent No.: US 9,683,853 B2
(45) Date of Patent: Jun. 20, 2017

(54) IMAGE MATCHING IN SUPPORT OF MOBILE NAVIGATION

(75) Inventors: Scott Carter, Los Altos, CA (US); Laurent Denoue, Palo Alto, CA (US); Arttu Perttula, Pori (FI)

(73) Assignee: FUJI XEROX CO., LTD., Tokyo (JP)

( * ) Notice: Subject to any disclaimer, the term of this patent is extended or adjusted under 35 U.S.C. 154(b) by 1319 days.

(21) Appl. No.: 12/359,222

(22) Filed: Jan. 23, 2009

(65) Prior Publication Data

US 2010/0191459 A1    Jul. 29, 2010

(51) Int. Cl.
*G01C 21/00* (2006.01)
*G01C 21/32* (2006.01)
(Continued)

(52) U.S. Cl.
CPC ....... *G01C 21/32* (2013.01); *G06F 17/30032* (2013.01); *G06F 17/30061* (2013.01);
(Continued)

(58) Field of Classification Search
CPC ....... G06T 19/003; G06T 19/00; G06T 19/20; G06T 2219/2004; G01C 21/367;
(Continued)

(56) References Cited

U.S. PATENT DOCUMENTS 5,262,867 A    11/1993  Kojima
7,990,394 B2 *  8/2011  Vincent ........... G06T 17/05
                                                   345/419
(Continued)

FOREIGN PATENT DOCUMENTS

JP    2001-188837    7/2001
JP    2006-092280    4/2006

OTHER PUBLICATIONS

M. Blighe et al., "Exploiting Context Information to aid Landmark Detection in SenseCam Images", ECHISE 2006—2nd International Workshop on Exploiting Context Histories in Smart Environments—Infrastructures and Design, 2006.
(Continued)

*Primary Examiner* — Reginald R Reyes
(74) *Attorney, Agent, or Firm* — Sughrue Mion, PLLC

(57) ABSTRACT

Method, apparatus and system for improving navigation using mobile devices by adding previously captured media to navigation maps provided by mobile device. Added media include still images and video clips. Media captured at the same location using various camera orientations are available in an image database. Images in database include metadata indicating location, orientation and other parameters associated with each image. User location and pose are matched against metadata indicating location and camera orientation of captured images. User motion may also be matched to metadata indicating camera motion of stored video clips. Other parameters like lighting, seasonal factors, and tasks of walking, biking or driving may also be matched. User pose may be derived from an accelerometer embedded in the mobile device. Some or all of user parameters desired by user may be directly input to mobile device by user instead of being automatically detected by mobile device.

15 Claims, 12 Drawing Sheets

(51) Int. Cl.
*G06F 17/30* (2006.01)
*H04N 1/00* (2006.01)

(52) U.S. Cl.
CPC ... *G06F 17/30241* (2013.01); *H04N 1/00244* (2013.01); *H04N 1/00323* (2013.01); *H04N 1/00127* (2013.01); *H04N 2201/0084* (2013.01); *H04N 2201/0086* (2013.01)

(58) Field of Classification Search
CPC ...... G01C 21/26; G01C 21/20; G01C 15/002; G08G 1/0969; G08G 1/00; G08G 1/005; G06F 17/30241; G09B 29/00; G09B 29/106; G09B 29/003; G09B 29/004; G09B 29/10
USPC .......................... 701/200, 211, 206; 345/427
See application file for complete search history.

(56) References Cited

U.S. PATENT DOCUMENTS

| | | | | |
|---|---|---|---|---|
| 8,373,582 | B2* | 2/2013 | Hoffberg | G08G 1/0104 340/539.13 |
| 2002/0126090 | A1* | 9/2002 | Kirkpatrick et al. | 345/158 |
| 2003/0034976 | A1* | 2/2003 | Raskar et al. | 345/427 |
| 2004/0073578 | A1* | 4/2004 | Nam et al. | 707/104.1 |
| 2004/0199326 | A1* | 10/2004 | Jung | B60K 31/0058 701/431 |
| 2005/0177305 | A1* | 8/2005 | Han | 701/211 |
| 2006/0210045 | A1* | 9/2006 | Valliath et al. | 379/202.01 |
| 2007/0067104 | A1* | 3/2007 | Mays | 701/211 |
| 2007/0070069 | A1* | 3/2007 | Samarasekera et al. | 345/427 |
| 2007/0242886 | A1* | 10/2007 | St John | G06K 9/3216 382/201 |
| 2008/0291201 | A1* | 11/2008 | Lafon | 345/427 |
| 2008/0291217 | A1* | 11/2008 | Vincent | G06T 17/05 345/629 |
| 2009/0171568 | A1* | 7/2009 | McQuaide, Jr. | 701/206 |
| 2010/0118116 | A1* | 5/2010 | Tomasz | G01C 11/02 348/36 |
| 2010/0123737 | A1* | 5/2010 | Williamson | G01C 21/3647 345/672 |

OTHER PUBLICATIONS

Y. Kharitonova, "Wii-trieve: Retrieving Motion Sequences Using Acceleration Data of the Wii Controllers", University of Hawaii, Hilo, http://www.cra.org/Activities/craw/dmp/awards/2007/Kharitonova/Yekaterina Wii-trieve.pdf.

IBM QBIC, http://wwwqbic.almaden.ibm.com/, retrieved on Jan. 16, 2009.

N. Peyrard et al., "Motion-based selection of relevant video segments for video summarisation", ICME, 2003.

Notification for Reasons for Refusal dated Dec. 13, 2011 in Japanese Patent Application JP 2009-168971.

* cited by examiner

Figure 7
701
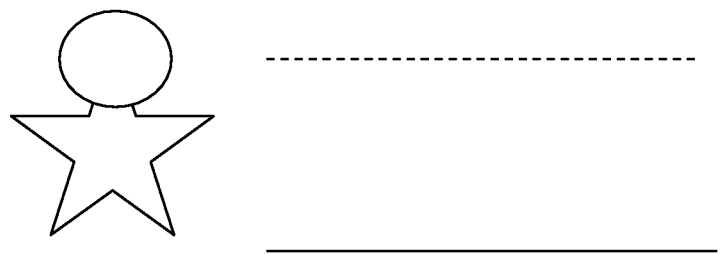
702
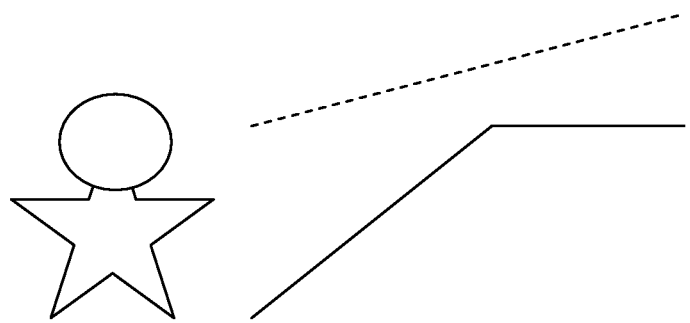
703
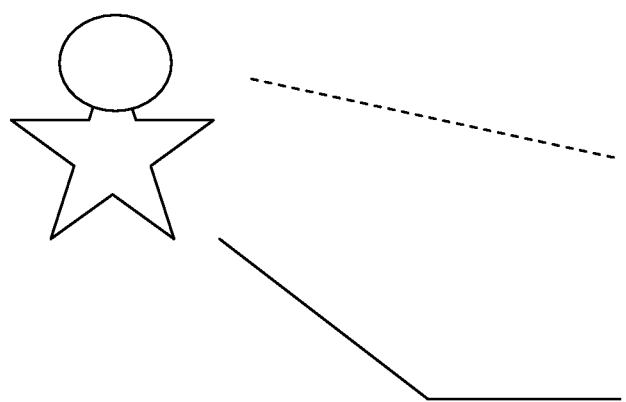

IMAGE MATCHING IN SUPPORT OF MOBILE NAVIGATION

DESCRIPTION OF THE INVENTION

Field of the Invention

This invention generally relates to methods and systems for navigation and, more particularly, to use of mobile devices for navigation. This invention also generally relates to image databases and, more particularly to search of image databases.

Background of the Invention

Navigating unknown streets and cities is a common problem addressed by several types of domains such as map searching software on personal computers, automobile navigations systems and handheld navigation systems. Networked mobile devices are well suited to address the navigation issue because of their ability to retrieve and display maps and information related to a user's current location and his planned destination.

In an unrelated field of endeavor, creating an image diary has become easier due to proliferation of digital cameras and camera phones. At the same time, the large number of images, available in an image diary, has required more advanced methods of managing the acquired images. For example, cameras designed to passively record a visual diary exist that may cover a typical day of a user wearing the camera. The user merely wears the camera and the camera automatically takes pictures when it is triggered by various events. The event may be a bike ride in the park or getting ready to go to work. An accelerometer embedded in these types of cameras is used to trigger media capture by indicating that a motion has occurred. Moving from a room to the outdoors is another example of a triggering event. A combination of data from an accelerometer, a light sensor and a temperature sensor may be used to detect event boundaries such as moving from a darker and cooler room to a warmer and brighter outdoors. The image diary would, then, include images from most or all different events of the day for the user. The images accumulated in such a diary may be summarized by extracting representative images from each event. The representative image selected from among a number of images recording an event is also called a landmark image corresponding to that event. The representative image, or landmark, is either manually selected or extracted as simply the middle image of each event.

One search tool available for searching video image databases, allows a user to make queries of image databases based on visual image content. This tool allows users to retrieve video according to object motion and camera pan and zoom. This tool applies to video only and is not applicable to static images. Moreover, the content data of the video clip is used for searching and retrieving particular video clips from the database.

Some methods for video summarization, analyze motion in a video to recover camera motion or object motion in the video. These methods perform a sequential segmentation of the video by detecting changes in the dominant image motion that is assumed to be related to camera motion. A long video is replaced by a small number of representative segments by temporal segmentation of the video into units that are homogeneous in terms of camera motion. The assumption is that the camera motion change traduces a change in the dynamic content of the scene or its relevance. The first step of video segmentation is followed by a step of recognition and selection for summarization that is supervised and depends on the video genre. These summarization methods are similar to the search method for searching video image databases.

Pose estimation and orientation estimation methods are used in personal awareness devices. Such devices are useful in medical and safety monitoring of people who are medically at risk and older people who wish to maintain their independence. Pose estimation and orientation estimation methods are used to estimate the pose and orientation of a user wearing a device that is making such measurements. For example, a light weight mobile device is worn by the user and used to collect information about the user's movements and track his activities and location. The device includes an embedded accelerometer and a magnetometer that are used for assessing movement of the user who is wearing the device. The techniques used by such devices can distinguish between sitting and standing up, as well as determine whether a person is running, walking, or standing still. The axes of the accelerometer and the magnetometer are aligned to have the same orientation. Therefore, by combining the data from the accelerometer and the magnetometer, accurate readings of movement may be obtained from the device no matter what the orientation of the device with respect to the ground. Therefore, personal awareness devices derive a gross estimate of a person's pose and orientation from the accelerometer data. Further, while pose estimation relies on abrupt changes detected by the accelerometer, absolute readings of the combination of the accelerometer and magnetometer may be used to determine orientation with respect to the ground.

In addition to devices that measure pose and orientation of a person wearing the device, there are devices that sense user motion and are often used for playing video games. The game player moves the device and a corresponding cartoon on the computer screen showing the game makes a similar movement. Turning the wheel of a game race car on the computer screen, for example, is obtained by the user turning the controller device that senses user motion. This way, maneuvering the car in the computer game is obtained with a similar motion by the player as opposed to pushing a button and the user feels that he is driving. These controller devices are used for other and more serious purposes as well. For example, one method for helping animators in creating animations uses controllers that sense motion of the user by using a 3-axis linear accelerometer. The user acts out a motion with the controllers attached to the body. The motion of the controller is sensed by the 3-axis linear accelerometer. The system then matches the acceleration pattern of the user's motion against clips of motion files stored in a database.

Some systems are able to reproduce a recorded image of an object using recorded auxiliary information regarding camera position such that the interrelationship between a plurality of recorded objects is preserved. One such system is described in U.S. Pat. No. 5,262,867 to Kojima and titled, Electronic Camera and Device for Panoramic Imaging and Object Search. An electronic camera has sensors for detecting an image of an object, the three dimensional position and azimuth of the camera, the focusing amount and the zoom amount. The image is recorded on a recording medium together with information concerning the three dimensional position and azimuth, the focusing amount and the zoom amount. An image reproducing device for the camera reproduces the recorded image on the basis of the information so that an interrelationship between a plurality of the recorded images is reproduced. Accordingly, the camera and the reproducing device are suitable for combining the recorded images so as to prepare a panoramic image, or to locate a desired article within an image of several different articles. The features of this U.S. patent are useful for augmented reality applications.

SUMMARY OF THE INVENTION

Aspects of present invention are directed to methods, devices and systems for using networked mobile devices for navigation purposes. Aspects of the present invention associate media files, such as photos and videos, with a navigation map to help users better orient themselves.

Aspects of the present invention address the issues associated with the fact that mobile devices have small displays and a user, who may be moving while using the device, is usually devoting only limited attention to the device. Accordingly, when selecting the images to be shown together with a map, it is desirable to show a limited number of images. On the other hand, the proliferation of cameras and other imaging devices has caused the databases from which such images may be drawn to grow. Therefore, it is further desirable to show those images that are most effective in assisting the user in navigation and there is a need for a method and a system for selecting a suitable set of images to be displayed to a user of a mobile navigation device.

Aspects of the present invention address the combined issues of small display of the device, limited attention of the user, and availability of a large number of photos and video clips for selection. Aspects of the present invention utilize user pose estimation and camera orientation to aid media selection from a large database of available media for mobile navigation tasks.

Aspects of the present invention include still images, video clips and other media together with a map being shown to a user of a mobile navigation device. To aid selection of the media shown to the user, aspects of the present invention utilize estimates of user location, motion and pose at the time of using the mobile navigation device. Estimates of user location, pose and motion are matched to camera location, orientation and motion at the time of capture of the image that is selected and retrieved. Location of the user is matched to the location of images in a database. An image desirable for display may be selected by matching the user pose at the time of using the navigation device to the camera orientation at the time of capture of the image. User pose may be estimated based on the pose of the mobile navigation device. If the user is moving and the image being matched is a video image, motion of the user is also matched to the motion of the camera at the time the video image was captured.

Regarding location, aspects of the present invention may utilize location data that is provided by global position systems (GPS) for locating both the user and the camera. Other consistent methods of locating an object may be used as well.

Regarding pose and orientation, user pose indicates the angles that the direction of sight of the user makes with the three location axes and camera orientation may include tilt and rotation. User pose may be estimated from the direction to which the mobile device is pointed or according to some other convention. Alternatively, user pose may be estimated independently and input to the mobile device. Information regarding the tilt and rotation of the camera at the time of capture of a particular image may be used to estimate camera orientation. This type of information may be inferred from image processing techniques. Alternatively, the accelerometer approach may be used that may be faster and more reliable when no clear ground-plane exists in the image. Aspects of the present invention provide methods and systems that allow users to retrieve pictures based on the motion and orientation of the camera. This is in contrast to the conventional systems that allow users to retrieve video by camera pan, zoom and object motion as opposed to camera motion.

Aspects of the present invention provide methods and systems that use the camera orientation at the time of capture of an image for image selection. This is in contrast to conventional systems that are able to locate a desired article within an image of several different articles based on a current position of the camera after the article has been photographed.

Elevation profile of the current location of the user may be used in order to determine the user pose and select the appropriate image. For example, if a user is facing an incline, it may be deduced that he would be directing his gaze upward and images taken in an upward direction would be selected.

Regarding motion, aspects of the present invention provide methods and systems that use motion detection controllers to input the type of motion of the user to the mobile navigation device. The type of motion input by the user with the assistance of the controllers is used to find a matching camera motion that was used to capture the image. Aspects of the present invention search for an image that was taken with a substantially matching camera motion. Users of conventional motion detection controllers find matching motion sequences by acting the motion they wish to match when wearing or holding the controllers. Aspects of the present invention, also match acted motions to clips stored in a database. However, in contrast to conventional methods, the motion input by the method and system of the invention is not that of the subjects filmed, but of the camera that filmed a scene or certain subjects.

Aspects of the present invention provide methods and systems that distinguish camera motion from scene motion and are also capable of summarizing pictures, where there is no motion to be found. The aspects of the invention do so by relying on external sensor data. This is in contrast to conventional methods of video summarization that are not applicable to summarizing pictures where there is no motion to be found from a single shot. This is also in contrast to conventional systems that may not be able to distinguish true camera motion from scene motion.

Aspects of the present invention may include various modes including a stationary mode, an interpolation mode and an extrapolation mode in a navigation device by a user. The stationary mode that pertains to a stationary user. The anticipation and extrapolation modes pertain to a moving user. Any of the modes may be used to display either confirmatory images or anticipatory images. Confirmatory images correspond to landmarks that the user should be viewing at his current location and current time. For the stationary mode, the anticipatory images may correspond to later time, for example night time images. For moving modes, anticipatory images correspond to anticipated and upcoming landmarks that may or may not be viewable at a distance from the current location of the user.

A stationary mode is invoked when the user requests his current location from the navigation device. Then, in addition to providing a map of the current location of the user, the device includes still photos of the landmarks at that current location. In addition to the location, the photos provided are matched to a current pose of the user possibly deduced from the pose of the navigation device or input to the navigation device. For example, if the back of the navigation device is facing up toward the northeast corner of an intersection where the user is standing, and a statue is located at the northeast corner, a view of the statue looking up at the statue is selected and shown on the mobile device in addition to the map. In this example the pose of the mobile device is used as a proxy for the pose of the user. Further, in this manner, the user can confirm his location on the map that is provided to him by the navigation device more easily and rapidly. In the stationary mode, the navigation device retrieves a map corresponding to the current location of the user and photos of the landmarks at that location corresponding to the pose of the user or the navigation device. A mere map may not be very user friendly. For example, with a mere map, the user has to still conform the information on the map such as street names to the information that he would be reading from street signs, provided there is sufficient light for him to read the signs. A dot on the map just shows the user where he is standing, it does not show him which way he is facing. However, a map together with appropriate photos of the landmarks may assist the user to quickly orient himself and plan his course of action.

An interpolation mode is invoked when the user requests a route from a current and first location to a second location from the navigation device. In the interpolation mode, the navigation device may show confirmatory landmarks or anticipated and upcoming landmarks together with the map. The landmarks may appear on the navigation device as the user progresses along the path so that the user may anticipate what he should be seeing next or see them from afar knowing that he is on the correct path. The view used for the landmarks is deduced from a current pose of the user or the navigation device and the motion of the user. For example, if the navigation device is pointing down, then the anticipatory landmarks would correspond to photos or video taken along that path while the camera was looking down. Pose cannot be interpolated, but elevation profiles may be considered in determining an upcoming pose. For example, if the user will be moving up a hill, his pose may be predicted to be directed upward. In the interpolation mode, the mode of transport of the user may be taken into account in selection of appropriate landmarks. For example, if accelerometer data indicates a user that is on foot, traffic signs intended for pedestrians may be selected as landmarks. If the user is riding a bicycle, a sign indicating "no cycling on this path" may be shown as one of the landmarks. Finally, if the user is driving, the landmarks shown on the navigation device would be selected to conform to views observed by a driver.

The extrapolation mode is used, when the navigation device updates the map as the user moves showing the extrapolated location of the user based on his current location and direction and speed of motion. In this mode, the user has not entered a destination into the device. The device may extrapolate a future location of the user and provide anticipatory landmarks that match the current pose of the user or the navigation device. Again, elevation profiles may be taken into account in adjusting the current pose for an expected pose along the extrapolated road. The anticipatory landmarks viewed from far by the user help him move in the correct direction. Confirmatory images are available for all modes.

Aspects of the present invention provide a method for forming an image database, the method comprising: receiving captured image data; receiving camera location data and camera orientation data corresponding to the captured image data; associating the camera location data and the camera orientation data as associated metadata with corresponding captured image data; and forming a database of the captured image data including the associated metadata.

Aspects of the present invention provide a method for navigation using a mobile device of a user, the method comprising: obtaining mobile device information, the mobile device information comprising mobile device location and mobile device pose; receiving a map corresponding to a user request; receiving a matched image corresponding to the map; and displaying the matched image together with the map, wherein the matched image is selected from a database including database images by matching the mobile device pose and the mobile device location respectively to camera orientation and camera location associated as metadata with each of the database images.

Aspects of the present invention provide a database system comprising: an input interface for receiving captured image data and receiving camera location data and camera orientation data corresponding to the captured image data; a first processor for associating the camera location data and the camera orientation data, as associated metadata, with a corresponding captured image data; a database for storing the captured image data together with the associated metadata as stored images; and a receiver for receiving user requests including user pose and user location; a second processor for determining matched images, the matched images matching the user pose and the user location to the camera location data and camera orientation data of the stored images; and a transmitter for transmitting the matched images to a user sending the user request.

Aspects of the present invention provide a mobile device for navigation, the mobile device comprising: a global positioning system module for detecting mobile device location; an accelerometer for detecting mobile device acceleration; a processor for deriving user pose from the mobile device acceleration; a transceiver for transmitting a user request and receiving a map corresponding to the user request and receiving a matched image corresponding to the map; and a display for displaying the matched image together with the map, wherein the matched image is selected from a database including database images by matching the user pose and the user device location respectively to camera orientation and camera location associated as metadata with each of the database images.

Aspects of the present invention provide a navigation system comprising: a mobile device having navigation capabilities; and an image database in communication with the mobile device, wherein the mobile device collects and transmits mobile device location data and mobile device pose data to a machine having access to the image database, wherein the mobile device location data and the mobile device pose data are matched to metadata indicating camera location and camera orientation associated with an image in the images database to obtain matched images, wherein the matched image is transmitted to the mobile device, and wherein the matched image is displayed with a map on the mobile device.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 7 shows impact of elevation profile of the user location for deducing user pose, according to aspects of the present invention.

DETAILED DESCRIPTION

Figure 1:
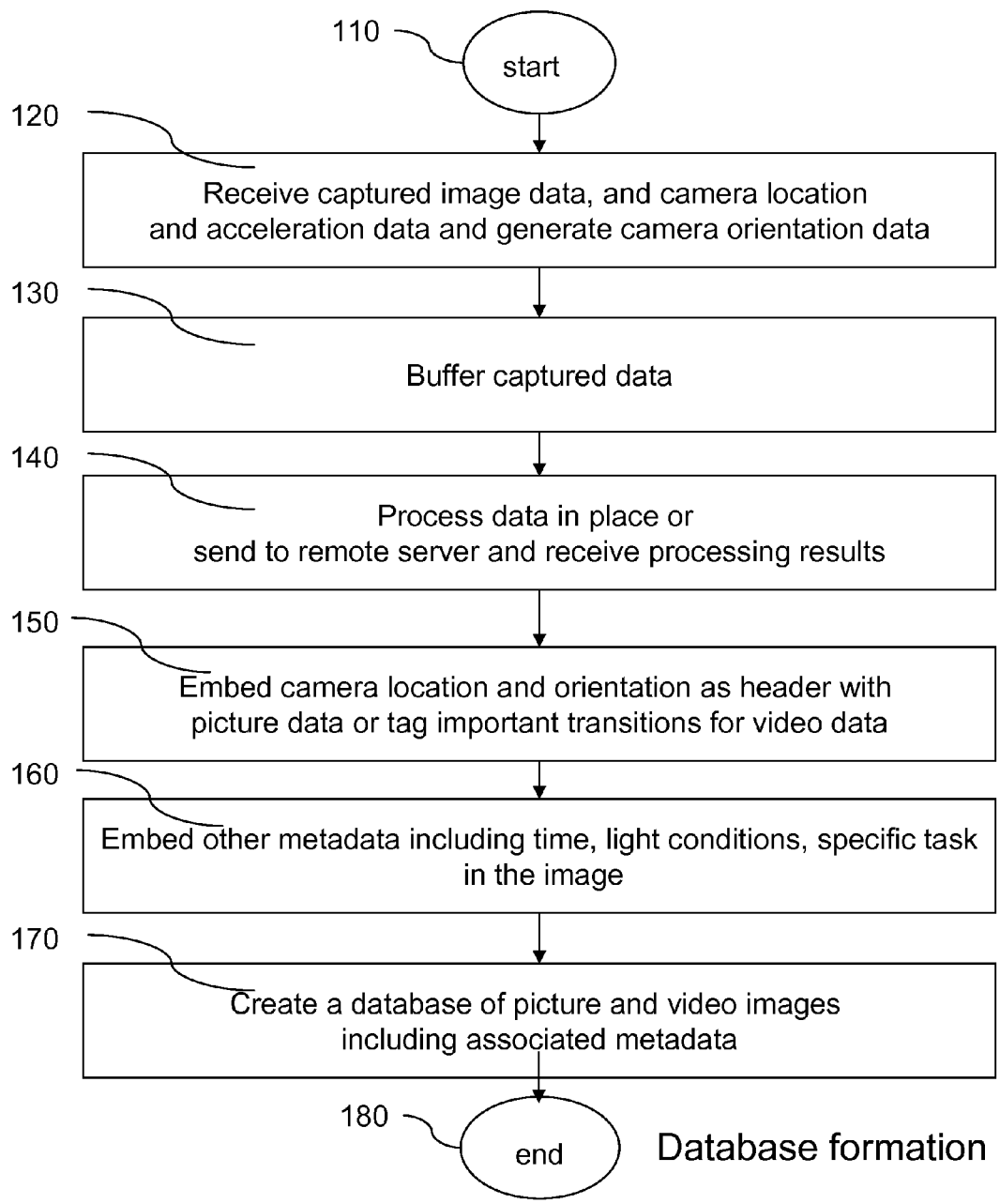
FIG. 1 shows a flow chart of forming an image database, according to aspects of the invention.

In the following detailed description, reference will be made to the accompanying drawings, in which identical functional elements are designated with like numerals. The aforementioned accompanying drawings show by way of illustration and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

The following detailed description provides exemplary embodiments of a navigation method and system that collects a data base of images and subsequently selects and provides images, still or in motion, corresponding to a current location, a planned path or location or an extrapolated path or location of a user of a mobile navigation device to aid the user locate himself more rapidly and using less of his attention. The following detailed description further provides exemplary embodiments of a mobile device having the capability to provide images that match the user location and pose together with a navigation map.

In the following description, location refers to the (x, y, z) location of a user or a camera, pose refers to the angles ($\theta$, $\phi$, $\omega$) that a vector pointing in an opposite direction as a vector normal to the display of the mobile device makes with the X, Y and Z coordinate axes. Because the display of the mobile device usually faces the user and has its back to the view being observed by the user, to show the direction that the user is looking, the vector pointing in the opposite direction of the normal vector is used. Orientation is merely the pose of a camera. Orientation of the camera determines the angles that a vector extending along the direction that the camera is pointed makes with the three X, Y, Z coordinate axes used to obtain the (x, y, z) location data. According to the above explanation, an image captured by a camera is defined by a 6 dimensional vector $v(x, y, z, \theta, \phi, \omega)$ and a view being observed by a user is also defined by a 6 dimensional vector $v'(x', y', z', \theta', \phi', \omega')$. However, any other consistent definition may be used for location, pose and orientation as long as the definition conveys the location of the user and the camera and the direction that the camera is pointing or the user is looking. For example, alternative coordinate systems, such as spherical and cylindrical coordinate systems may convey the same information with fewer parameters. The (x, y, z), or an equivalent, location data may be obtained from global positioning system (GPS) data.

Pose data is meant to convey, for example, whether a user is sitting and looking up or standing and looking down. Orientation data is meant to convey, for example, whether the camera was looking up or pointed down when a particular image was captured. In some situations, location may be limited to x and y data and z data may not be necessary.

Further, matching of the previously captured image with the current view of the user does not have to be exact. One or more of the previously captured images may be selected according to one or more match criteria. The match criteria may ask for the captured image to be taken by a camera that operated at the exact current location of the user and at the exact current angle that the user is pointing or selects. In that case, if the above vector notation is uses for camera parameters and user parameters, v has to be equal to v'. In another example, the match criteria may ask for the captured image to be within an acceptable range of the user's current parameters or the desirable parameters entered by the user. In this example, if the vector notation is used, then $v'-u<v<v'+w$ where u and w are vectors of the same dimension as v and v' that provide an acceptable range for the selected image vector v. In yet a different example, the match criteria may be specified as one or more of the captured images closest to the current parameters or desired parameters of the user.

Aspects of the present invention provide a solution to a problem of selecting appropriate images for inclusion with a map presented to a user by a mobile navigation system. An overall system includes a database of collected images that may communicate with a mobile navigation device together with the mobile navigation device in communication with the database.

Aspects of the present invention provide a database of images, including pictures and video clips, where each image has associated metadata. The associated metadata include information regarding the location of the image and the orientation of the camera when the image was taken. The associated metadata may further include information regarding the motion of the camera that took the pictures, the time the picture was taken, and lighting conditions. Time includes calendar time which signifies seasonal changes in the imagery. Lighting conditions include day, night or overcast conditions. Meta data may also include task specific indicators. For example, the images may be taken from the view point of a pedestrian, a bicyclist or a driver. When more pieces of information are associated with an image, the vector representing the image data increases in dimension to include, for example, time (t), lighting (l) and task (s) and to yield a 9D meta data vector $v(x, y, z, \theta, \phi, \omega, t, l, s)$.

Aspects of the present invention match location and pose of a user to location and orientation of a camera that captured the images in order to select the most appropriate images to be shown to the user. In addition to location and pose, motion of the user may be matched to the motion of the camera. Other parameters such as lighting conditions, seasonal variations, and user specific tasks may also be matched. For example, an image shown to a user at night was also taken at night. An image shown to a user, who is at a certain location in winter, is an image that was taken at that location in winter when trees had no leaves. An image shown to a user on bicycle was taken from the viewpoint of a bicyclist and an image shown to a driver was taken from the view point of a driver.

Aspects of the present invention may associate a 6D vector $v(x, y, z, \theta, \phi, \omega)$ with each captured image. Then, the information implicitly conveyed by the mobile device through the 6D coordinates of the accessing mobile device may be matched to the vector associated with each captured image in the database. If more parameters are to be matched, the dimension of the associated metadata vector and the detected vector increase.

Aspects of the present invention may forego the detection of the user information and instead receive direct or indirect input from the user indicating, for example, which view the user wishes to see. In this aspect of the invention, the user specifies the desired camera orientation, according to his current pose, according to a predefined preference, or according to a selection in a graphic user interface (GUI), or the like. In this manner, users can hold the mobile device at a comfortable angle while still accessing content according to the previously captured orientation information. For example, if the aspects of the present invention associate a 6D vector $v(x, y, z, \theta, \phi, \omega)$ with each captured image, then, six pieces of information including the desirable match information and defining a 6D vector $v'(x', y', z', \theta', \phi', \omega')$ may be entered into the mobile device explicitly and manually by the user.

Aspects of the present invention may operate in a stationary mode, an interpolation mode or an extrapolation mode. The stationary mode confirms the current location of a standing user or shows him what he may anticipate to see at that location later when night falls. The interpolation mode presents the users with images of landmarks they must be seeing around them thus confirming their location or images of landmarks they should anticipate along a preplanned path. The extrapolation mode extrapolates the future location of the user based on the speed and direction of his motion and presents confirmatory or anticipatory images along the extrapolated map to a user who does not know where he is going.

In contrast to the aspects of the present invention, in conventional methods of creating an image diary, the representative image is not selected according to any particular automatic filtering. Further, conventional search tools for searching video databases, apply to video only and are not applicable to static images; these search tools do not use metadata and rely on the content information of the video to perform the search. The conventional video summarization methods are CPU intensive or unreliable. For example, they may not be able to distinguish the true camera motion from scene motion. These video summarization methods are not applicable to summarizing static pictures, where there is no motion to be found from a single shot. Conventional user motion sensing devices match the current motions of the user to clips of motion available in the database or library. They match motion of person to person. They do not match the motion of a person to the motion of a camera that took certain images. Therefore, they cannot extrapolate what user motion would correspond to what camera motion.

FIG. 1 shows a flow chart of forming an image database, according to aspects of the invention.

The method begins at 110. At 120, captured image data, camera location data and accelerometer data are received. Image data includes still picture or video data. Accelerometer data may be received from an accelerometer associated with the camera and may be used to derive camera orientation data. At 130, this captured or generated data is saved in a buffer. Image data, camera location data and acceleration data may be saved in separate, time stamped and linked files. At 140, the buffered data may be processed in place or optionally sent to a remote server. Estimates of camera orientation are received from the remote server or obtained locally based on the acceleration data. If the image being captured is video data, then a list of time stamped events for video data are received from the remote server or obtained locally. The time stamped events correspond to changes in the orientation of camera. At 150, camera location and camera orientation are embedded as a header with picture data. In the case of video data, important transitions are tagged according to the changes in the camera orientation. At 160, other metadata including information such as time, including the date and the season the image was captured, lighting conditions including day or night lighting or overcast conditions, and task specific indicators, indicating walking, biking or driving may optionally be associated with the captured image. At 170, a database of images is created where each image has metadata associated with it that identifies various aspects of the image. At 180, the method ends.

Aspects of the present invention capture accelerometer data in a buffer of length t. When a user takes a picture or starts recording a video clip, the accelerometer data in the buffer is saved along with the captured media. The image data, whether picture or video, is saved in a separate, time stamped file that is linked with the file saving the accelerometer data and camera orientation data. The buffered data is sent asynchronously to a remote server. The server uses the received data and returns an estimate of the camera orientation corresponding to the time the image was captured. In one aspect of the present invention, the information may be processed locally without being sent to a remote server. The orientation of the camera at the moment of capture is then embedded as a header in the captured media. For video images, accelerometer data is also saved until the end of the recording of the video. The accelerometer data may then be sent to a remote server or processed locally. As a result of processing the accelerometer data, a list of time stamped events is produced during which the orientation of the video changed. This data is saved and can be used to tag important transitions in the video. As explained earlier, the metadata associated with each image or video clip may be in the form of an n-dimensional vector that at the least includes location and camera orientation information and may include further pieces of information as components of the vector.

Figure 2:
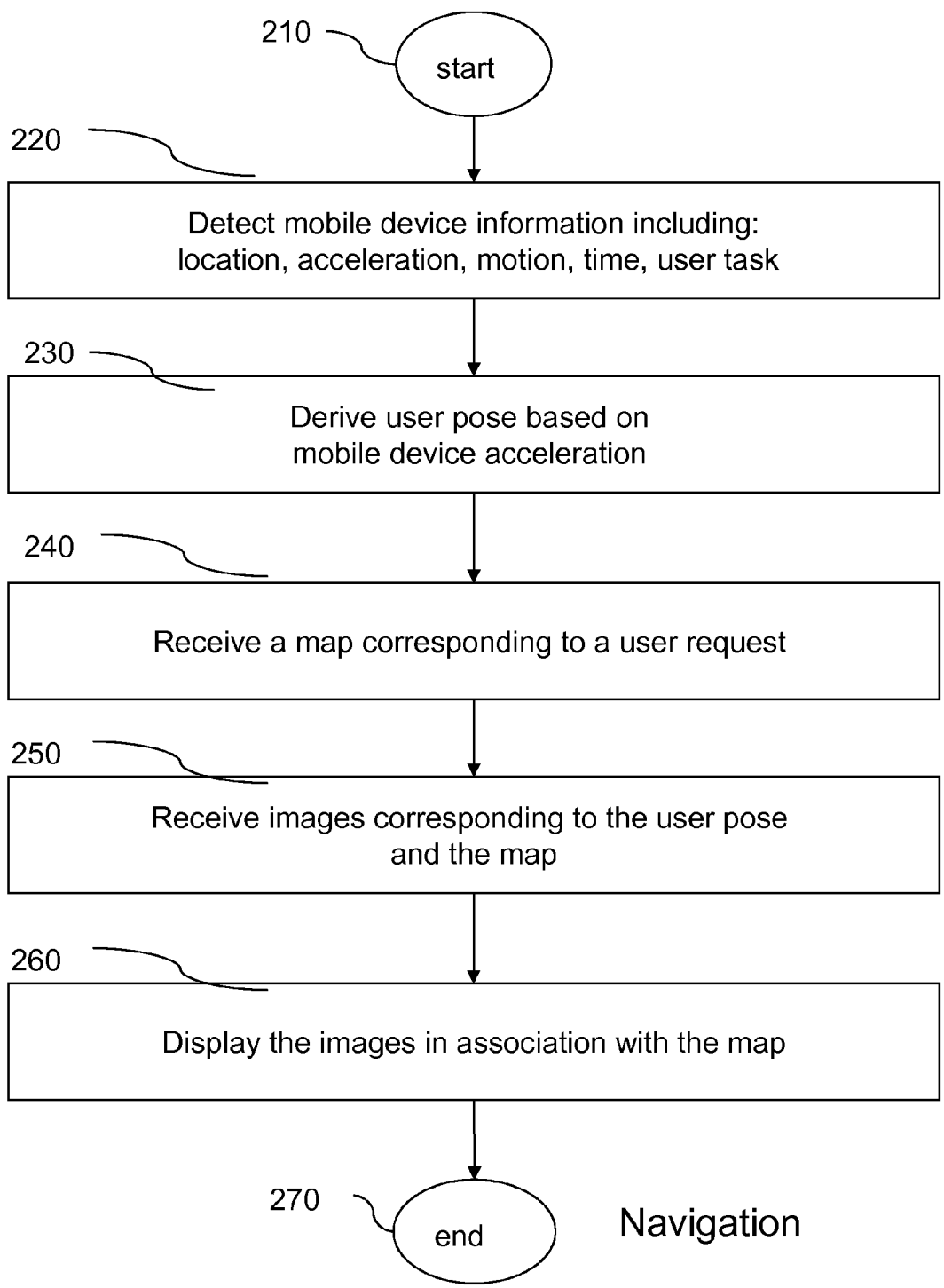
FIG. 2 shows a flow chart of a method of providing images with a navigation map, according to aspects of the present invention.

FIG. 2 shows a flow chart of a method of providing images with a navigation map, according to aspects of the present invention.

The method begins at 210. At 220, the mobile device's location and acceleration are determined. Other data, such as motion and time may also be detected at this stage. A user may input his specific task to the mobile device at this point or later. At 230, user pose is derived based on acceleration and orientation data. User pose may be deduced from mobile device pose or may be independently determined by a separate device and input to the mobile device. At 240, a map, such as a street map, corresponding to the user request is retrieved for being shown to the user. The user may request a map of his current location, a path between his current location and a destination or may allow the mobile device plot an extrapolated course for him based on user's velocity of motion. Velocity includes speed and direction. At 250, the location and derived pose of the user or mobile device is compared to camera location and orientation of images in a database to select a matching image for being shown to the user. The matched and selected image may be a still picture or a video clip. The images searched correspond to the same location as determined for the mobile device or interpolated and extrapolated locations of the mobile device. At 260, the matched images are shown in association with the map. Because the displays of most mobile devices are small, the selected images may be shown on a side of the map with dots or arrow showing the location corresponding to the image on the map. At 270, the method ends.

In one alternative aspect of the present invention, instead of detecting the mobile device information at 220 and deriving user pose at 230, this and other information may be explicitly and manually entered by the user. The user may desire to see a view pertaining to a different angle or a different time of the year (if time is one of the parameters available in the database) and instead of pointing his mobile device in a particular direction, the user enters the desired pose into the mobile device.

One aspect of the present invention provides an approach to media selection and search that makes use of camera pose and orientation derived from the state of a device's embedded 3-axis accelerometer at the time of capture of an image.

Given a set of captured media and associated pose and orientation information, aspects of the present invention provide relevant media snippets to a mobile user based on the user's location and motion.

The parameters of mobile device location and pose are compared versus the parameters of camera location and orientation at the time of capture of an image to select an image with matching parameters.

For example, at a certain location, if a mobile navigation device is posed to point downward, a mobile photo search interface, according to aspects of the present invention, would retrieve photos taken of flowering bushes that are located downward from a camera, located at the same location, and used to capture the image. If at the same location, the mobile navigation device is posed to point upward, the mobile photo search interface would retrieve photos taken of flowering trees that are located upward from the camera used to capture the image at the same location. As another example, a video summary shown to the user can show video clips taken of the sky, located upward from the mobile device at the time of search and upward from the camera at the time of capture, while leaving out those video clips taken of water flowing downward from the mobile device and the camera that took the images.

More parameters may be matched if desired. For example, motion, seasonal changes, lighting changes and the task of the user may be used as matching parameters when searching the captured image database. For more parameters to be used in the matching process, the parameter must either be recorded during capture or derived from processing of some other data. For example, time data may include date data that may in turn be used to derive season data, considering that a same location usually looks different in winter and summer. Time data may also be used to derive whether an image was taken at night or during the day. Lighting data may be used independently of time data to show other lighting factors such as moon light at night or overcast conditions during the day. To be searchable, the additional parameter is attached as metadata with the image data. Task data refers to walking, biking, driving, or motion for business purposes as opposed to sight seeing in a foreign place. A business traveler may look for banks while a sightseer may look for churches.

Figure 3:
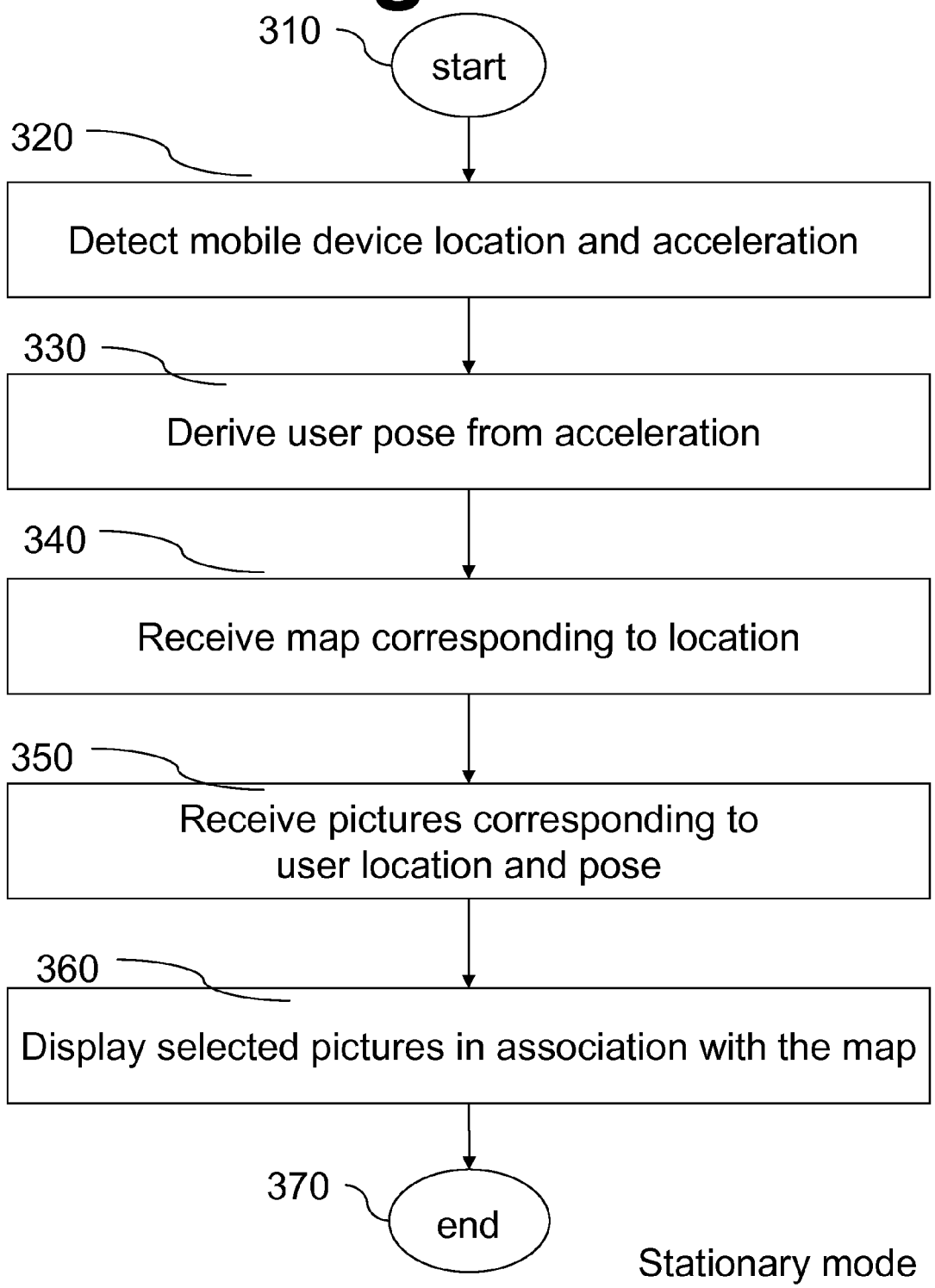
FIG. 3 shows a flow chart of a method of providing images with a navigation map in stationary mode, according to aspects of the present invention.

FIG. 3 shows a flow chart of a method of providing images with a navigation map in stationary mode, according to aspects of the present invention.

In the stationary mode, the user is standing in one location and looking around to confirm his situation at that location. When standing at an intersection, a map of the intersection showing the location of the user with a dot may be provided by most navigation systems. However, with such maps, the user still does not know which direction he is facing unless he reads street names. That may be difficult depending on how well prepared or well lit the signs are or how old or literate the user is. The stationary mode provides easily discernable pictures to the user that allows the user rapidly locate and orient himself with respect to the map.

At 310, the method begins. At 320 the mobile device detects its location and acceleration. At 330, user pose is derived from the acceleration either at the mobile device or at a server in communication with the mobile device. The user pose is deduced from the pose of the mobile device. Alternatively, user pose may be determined independently and input to the mobile device or even an arbitrary pose desired by the user may be manually input to the mobile device. At 340, a map corresponding to the mobile device location is received by the mobile device. At 350, matched pictures are received at the mobile device. These pictures are matched at a location including an images database. The location and user pose data are compared with the location and camera orientation of the images in the database and matching images are selected and sent to the mobile device. Both steps 340 and 350 may happen concurrently when performed by the same server and the map with the matched pictures arrives at the same time at the mobile device. At 360, the mobile device displays the matched images in association with the map. The images may be shown on the map if the display size permits or on a side of the map with their location on the map marked. At 370, the method ends.

Figure 4:
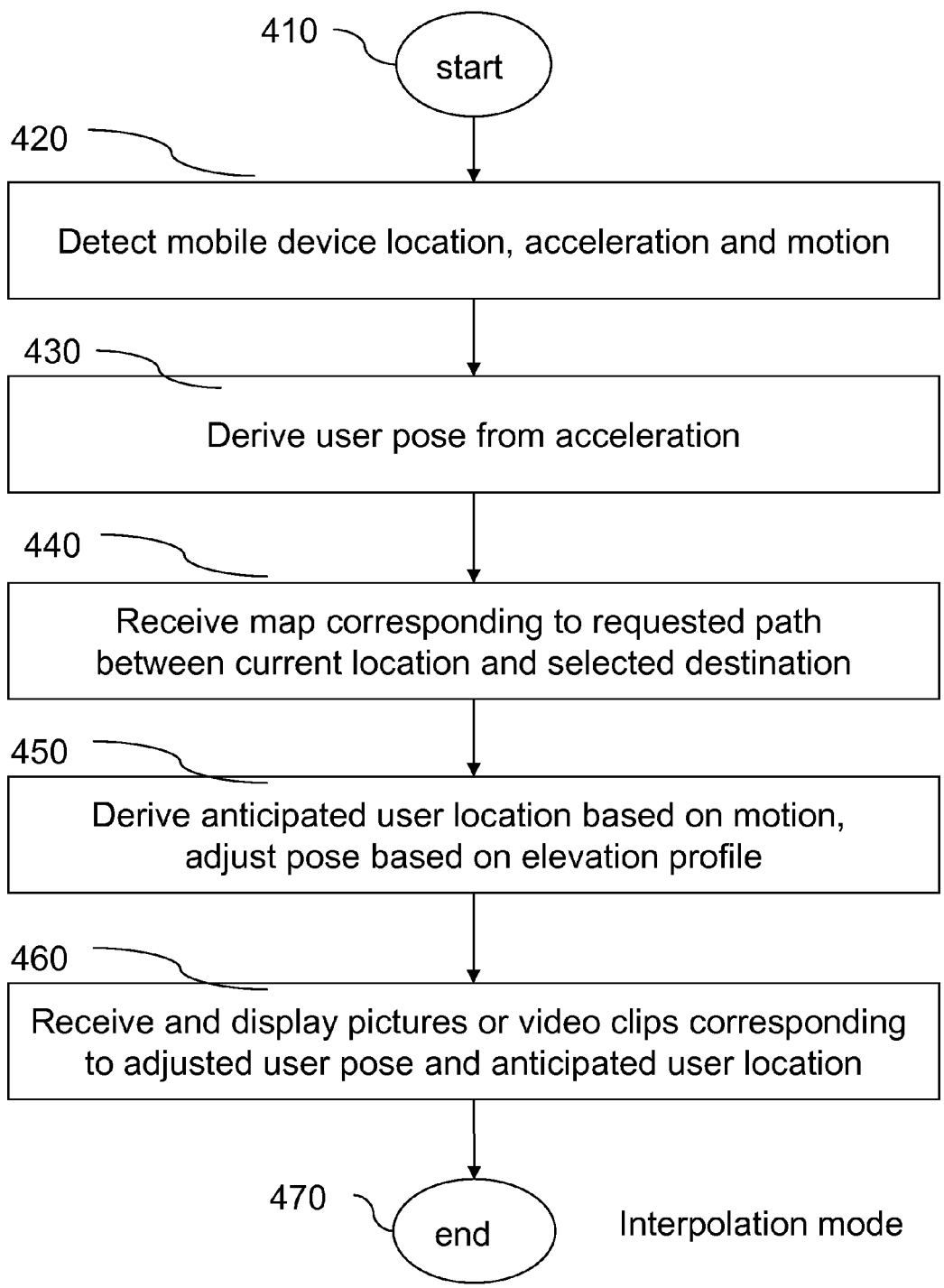
FIG. 4 shows a flow chart of a method of providing images with a navigation map in interpolation mode, according to aspects of the present invention.

FIG. 4 shows a flow chart of a method of providing images with a navigation map in interpolation mode, according to aspects of the present invention.

In the interpolation mode, the user is moving along a predetermined path and the mobile device shows him the images he should be seeing at the present or should anticipate to see in the near future. The user may request a map showing a path from his current location to a destination location. As he moves along the path, the mobile device matches either his current location or his anticipated location and his pose to the location and camera orientation of the images in the image database. Matched images may be pictures or video clips. Matched images are received at the mobile device and shown to user. Depending on user preference, the user may use this mode to again confirm that he is on the right path by viewing landmarks that he should be seeing. Alternatively, the user may used this mode to anticipate what he should see next and find his way faster by being shown anticipatory landmarks and images. User motion data is used to determine which pictures or video clips are shown to him.

At 410, the method begins. At 420 the mobile device detects its location, motion and acceleration. At 430, user pose is derived from the acceleration either at the mobile device or at a server in communication with the mobile device. At 440, a map corresponding to a requested path is received by the mobile device. The user may request a mapped path from his current location to a destination. At 450, motion data of the mobile device is used to derive the anticipated location of the user at a near future. Motion data may merely include speed when the path is predetermined and as long the user remains on the path or may include both speed and direction together. Once the path is determined, the elevation profile may be used to adjust the current pose to an expected pose. For example, if a hill is upcoming, a user who is currently looking straight ahead would likely look upward. At 460, matched images are received and displayed at the mobile device. These images may be still pictures or video clips and are matched at a processing location that has the image database. The user pose data or adjusted pose data and the anticipated location are compared with camera orientation and location of the images in the database and matching images are selected and sent to the mobile device. The matched images are displayed in association with the map. The images may be pictures of landmarks that the user is seeing or should shortly appear to the user if he continues on the path or video clips of the images he is seeing or will be seeing shortly along the mapped path. When video clips are selected, motion data of the user is also matched to the motion of the video camera. At 470, the method ends. Some of the matching data may be explicitly input by the user instead of being detected by the mobile device or derived from detected data.

Figure 5:
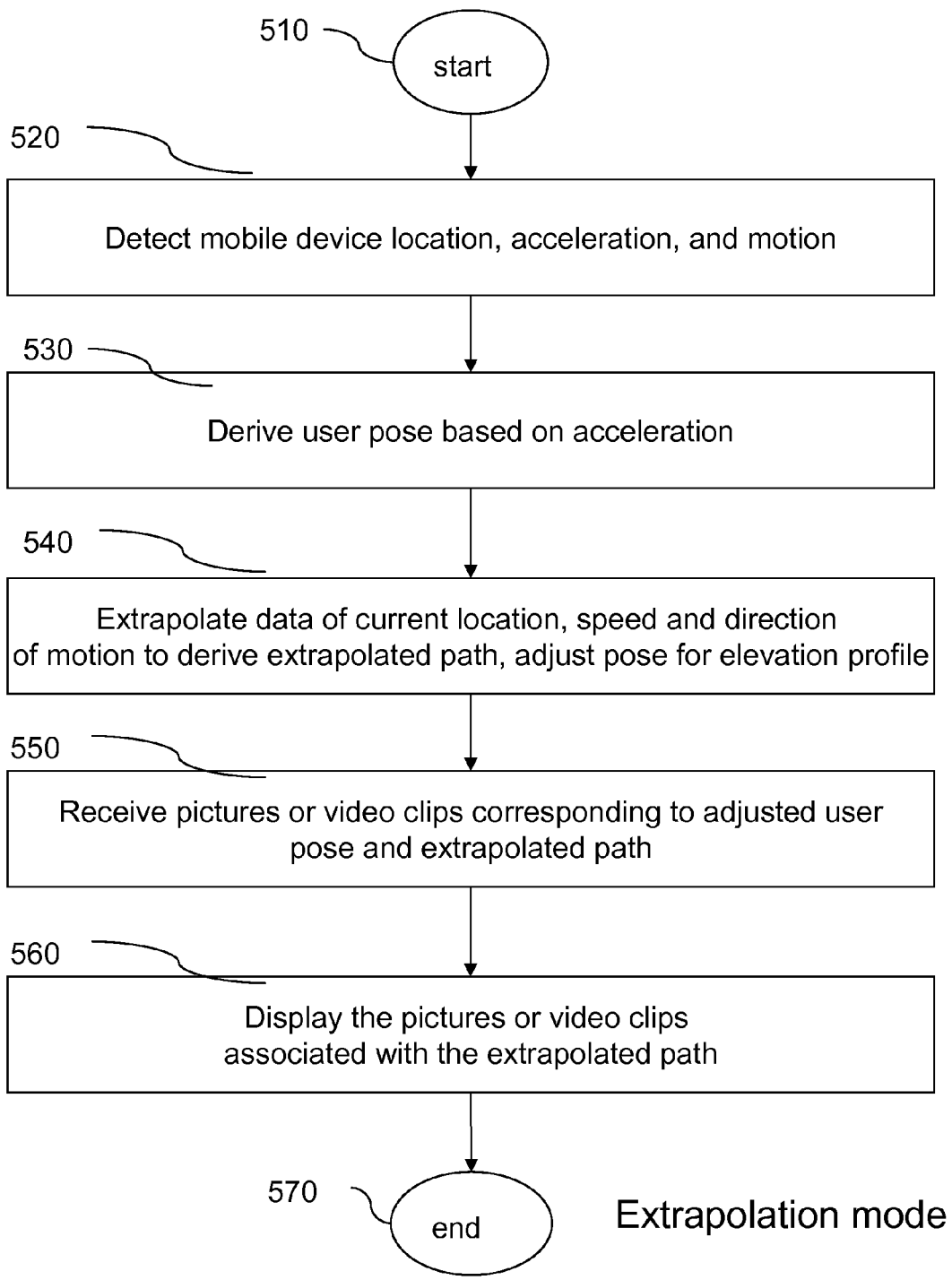
FIG. 5 shows a flow chart of a method of providing images with a navigation map in extrapolation mode, according to aspects of the present invention.

FIG. 5 shows a flow chart of a method of providing images with a navigation map in extrapolation mode, according to aspects of the present invention.

The extrapolation mode is used when velocity, including both speed and direction, of motion of the user is known and his likely path may be extrapolated from his current location. But, the path is not known all the way because the destination is not provided to the mobile device. In this mode, either confirmatory images or anticipatory images may be shown associated with the extrapolated path. Motion of the user may be taken into consideration for showing the anticipatory images and also for matching video clips that have a camera motion matching the user motion. Elevation profiles of the upcoming terrain may be taken into account for adjusting a current pose of the user.

At 510, the method begins. At 520 the mobile device detects its location, acceleration and motion. At 530, user pose is derived from the acceleration. At 540, a map corresponding to an extrapolated path is received by the mobile device. In this mode, the current motion data are used to extrapolate the path. Motion data must include both speed and direction together in order to enable extrapolation. At 550, matched images are received and displayed at the mobile device. These images may be still pictures or video clips. The user pose data and the current or extrapolated location are compared with camera orientation and location of the images in the database and matching images are selected and sent to the mobile device. When video clips are selected, motion data of the user may also be matched to the motion of the video camera. Pose data may be adjusted for elevation profile. At 560, the matched images are displayed in association with the map showing the path. The images may be selected to be confirmatory or anticipatory based on the extrapolated map. At 570, the method ends. Some of the matching data may be explicitly input by the user instead of being detected by the mobile device or derived from detected data.

Figure 6:
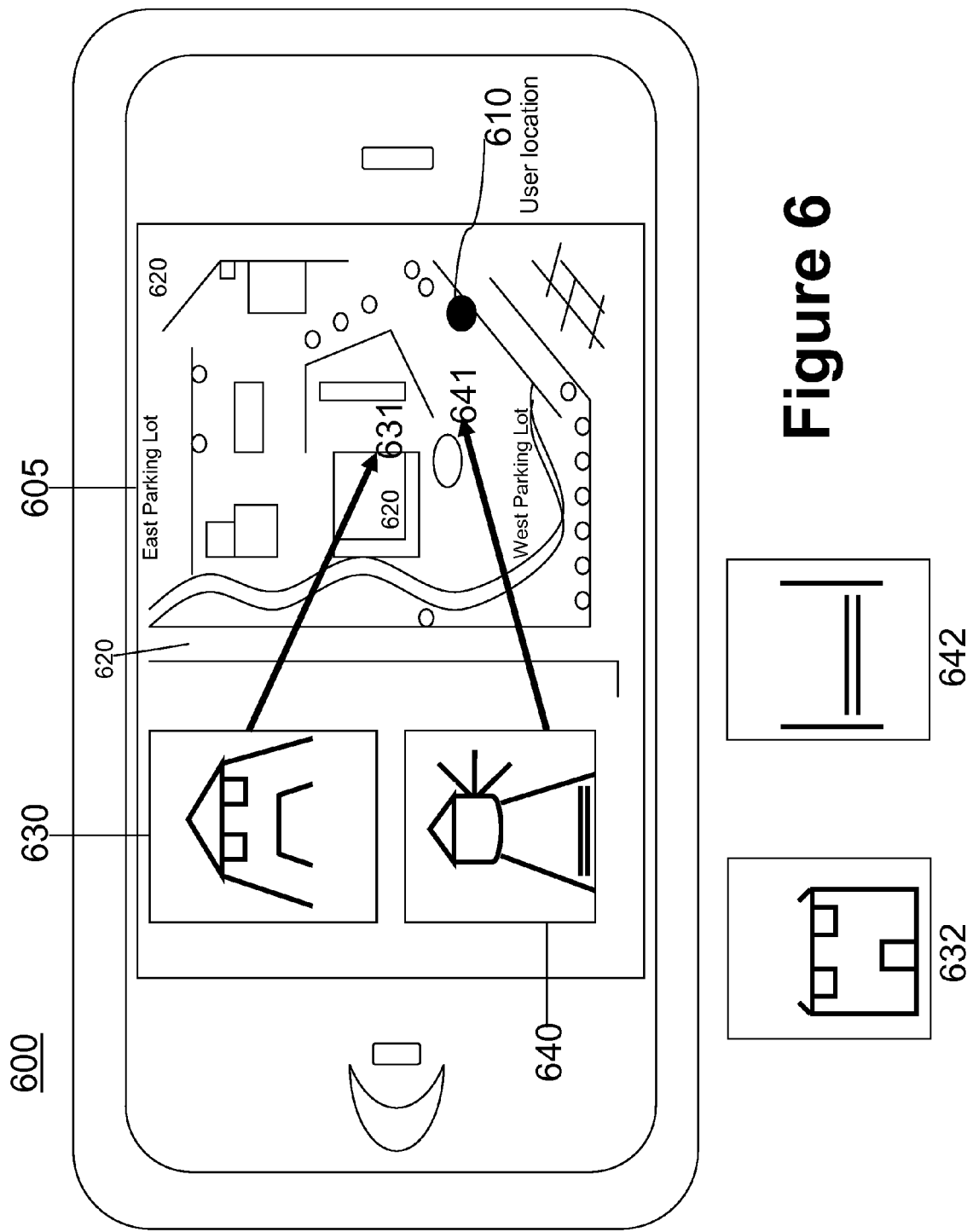
FIG. 6 shows a mobile device including a mobile navigation application according to aspects of the present invention.

FIG. 6 shows a mobile device including a mobile navigation application according to aspects of the present invention.

FIG. 6 shows a mobile navigation device 600. In this drawing, images 630 and 640 are selected based on the orientation of the camera at the time of capture and the location of the user 610. Images at the bottom 632, 642 were rejected because of improper camera angle.

A map 605 is shown to a user on the screen of the mobile navigation device 600. The user location is shown with dot 610. Buildings 620, roads 620 and other map related features 620 are also shown on the map 605. Additionally, images 630 and 640 appear on the mobile navigation device 610. These images correspond to the view that the user would see from his current location 610 when looking toward locations 631 and 641 on the map, respectively. The user standing at location 610 has his mobile navigation device oriented and posed upward. Therefore, the images 630 and 640 correspond to images taken with a camera located where the user is now standing at 610 and pointing upward. Because the camera was looking up when the image 630 of the house was taken, the house appears wider at the base and narrows upward. Similarly, because the camera was looking up when the image 640 of the water tower was taken, the water tower appears as shown. Images 632 and 642 are the images of the same house and the same water tower shown in 630 and 640 and located at 631 and 641 on the map, respectively. However, the images 632 and 642 were taken with the camera having a different orientation or pose. In these images 632, 642, the camera was closer to the object such that the top portion of the house would not appear in the image 632 and the sides of the water tower would appear parallel in image 634. Therefore, images 632 and 642 are rejected and are not included on the display of the mobile navigation device 600. If the camera had been looking down and at an angle at the same object or landmark, a third view of each object would have also been available in the database but rejected by the system.

The aspect of the invention shown in FIG. 6, presents still images to the user. In one aspect of the present invention, video clips may be used in place of the still images 630, 640. For example, a video image may be captured by a video camera while the photographer is walking and standing at times. If the segments captured while walking are surrounded by segments taken while standing still, the segments may be tagged. Then, video snippets can be extracted from the original longer clips by selecting segments captured while walking from the surrounding segments taken while standing still. As another example, a user can also easily retrieve parts of a video clip where the camera pans circularly and downwards. For example, when the camera is worn by one skier following another skier going downhill.

These queries can be actively input by the user using a traditional GUI to a database including images. Alternatively, the appropriate queries can be automatically constructed by the system as the user physically moves in his/her environment. For example, a user biking through the woods would get pictures taken by a camera of a photographer who had similar motions. This would retrieve pictures more relevant to this user's activity, such as a sign saying "no bikes allowed on the right trail." A hiker would not receive the same picture from the system.

As FIG. 6 shows, two or more images may be shown simultaneously on the mobile device if the user chooses to see the images associated with different locations on the map that were taken by a camera at or near the user's current location. As described above the map locations may be manually entered by the user instead of being automatically detected by the mobile device. Also, as described above, the images may be selected according to various match criteria that may require a near exact match or may be more lenient and accept images that provide an approximate match with the user's parameters.

FIG. 7 shows impact of elevation profile of the user location for deducing user pose, according to aspects of the present invention.

Pose can be adjusted according to upcoming elevation profile. Moreover, pose can be coupled with elevation profiles to adjust selected images for mobile navigation. FIG. 7 shows three scenarios where the elevation profile would prompt the user to look straight forward 701, upward 702 or downward 703. In this situation, motion can be used to predict pose and therefore to predict media to display. For example, as the user is about to walk down stairs, the system can automatically display photos and video snippets where the camera was looking down and in a similar orientation even if the current user pose at the top of the stairs is registered as looking ahead or up. Then, the user can then see only those pictures of the stairs going down.

In mobile navigation tasks a standard map is often insufficient to guide the user without exposing landmarks that are easily recognizable in the environment to help orientation. With the aspects of the present invention, such landmarks are automatically selected by showing the user previously captured media taken while the camera was oriented upward and/or while the user taking this media was standing up. The combination of pose and the elevation portion of the location data determine both the orientation and standing up or lying down aspect of the pose. This pose information may also be coupled with OCR, object recognition, or elevation profiles to find photos especially useful for navigation.

Figure 8:
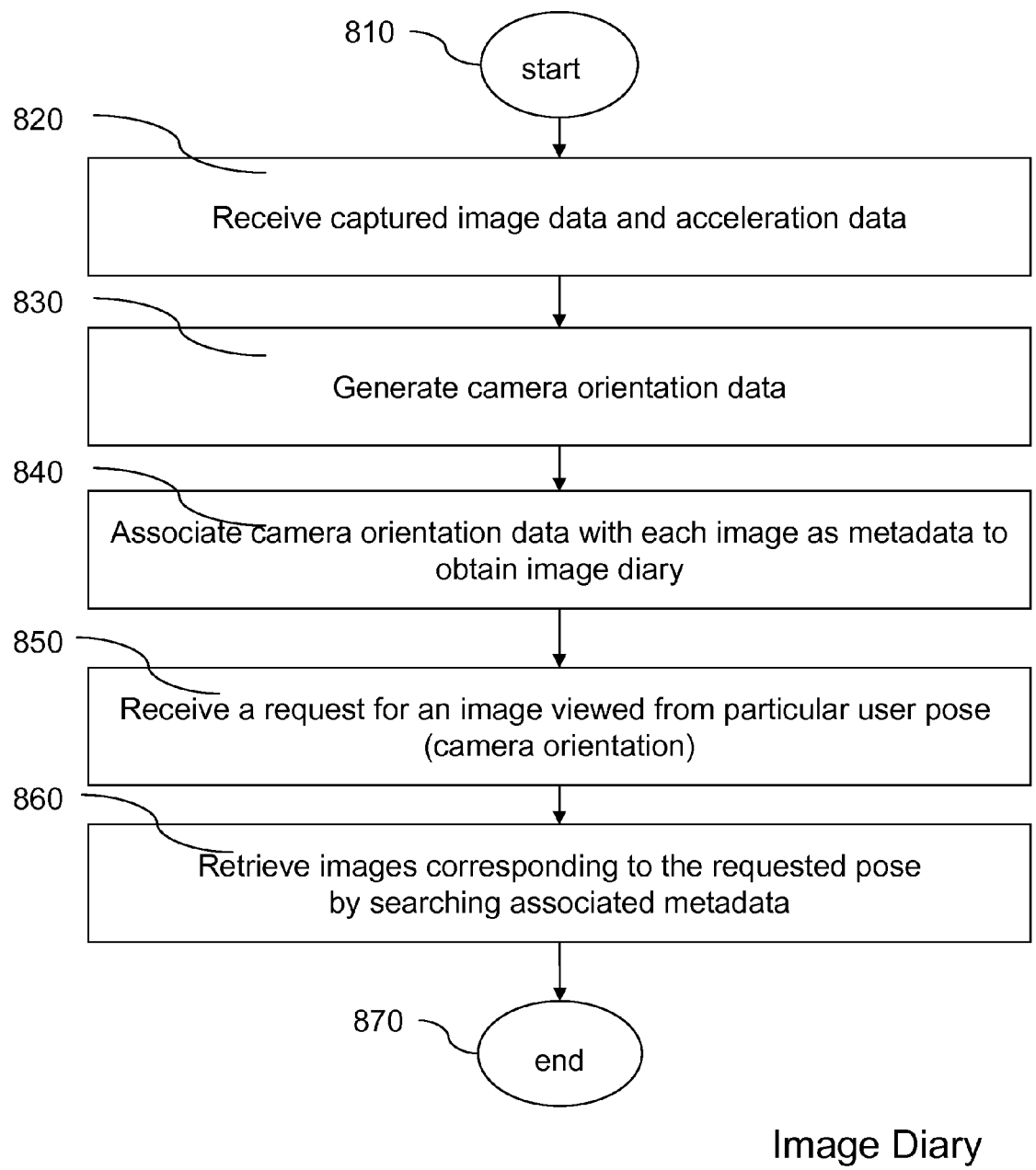
FIG. 8 shows a method for retrieving images according to pose, according to aspects of the present invention.

FIG. 8 shows a device for retrieving images from an image diary according to pose, according to aspects of the present invention.

An image diary of images taken during a day may be easily and rapidly searched by matching pose data. The methods and systems of aspects of the invention can be used to retrieve media, for example, after a day of site seeing. For example, users can quickly find video snippets or pictures of "times when I looked down with my camera". The user interface for retrieving and browsing the collection can use icons to depict different kinds of pose and motion.

One exemplary method, shown in FIG. 8, begins at 810. At 820, an image diary device receives captured image data and acceleration data. At 830, either the image diary device, or a server in communication with the image diary device, generates camera orientation data from the accelerometer data. At 840, camera orientation data is associated with each image as metadata. At 850, the image diary device receives a request for an image viewed from a particular user pose and captured images are searched for the particular user pose by searching associated metadata. User pose and camera orientation may be taken as proxies for each other. At 860, images corresponding to the requested pose or orientation are retrieved. At 870, the method ends.

Figure 9:
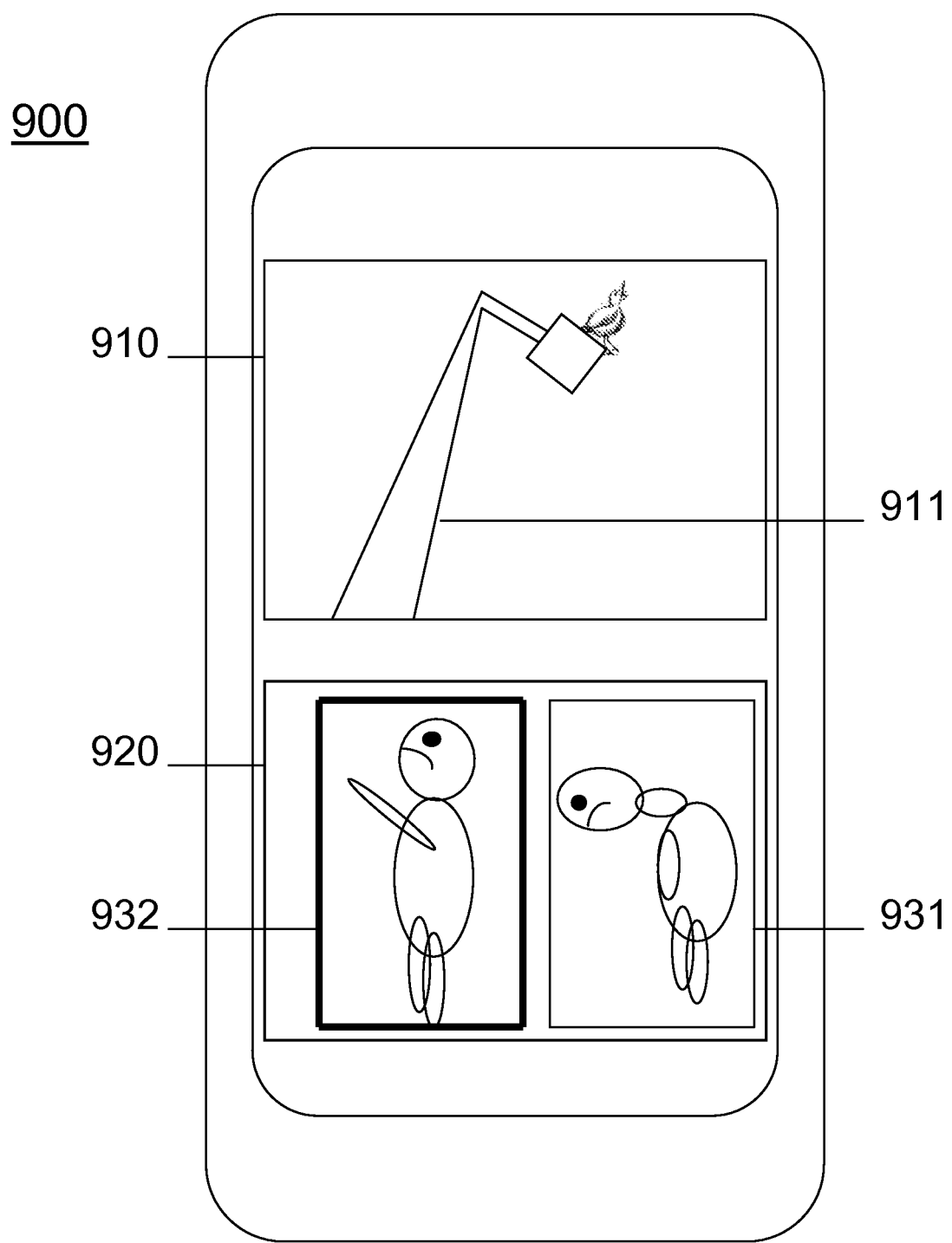
FIG. 9 shows a device for retrieving images according to pose, according to aspects of the present invention.

FIG. 9 shows an image diary device for retrieving images according to pose, according to aspects of the present invention.

An image diary device 900 according to aspects of the invention is shown in this drawing. The image diary device may include a display that also constitutes a user interface. It may alternatively include separate display 910 and user input interface 920. The user interface 920 may be a graphic user interface. The user interface 920 is used for retrieving and browsing the image collection and includes icons 931, 932 to depict different kinds of pose and motion. Activating an icon 932, corresponding to a person looking up, would retrieve the images stored in the image diary whose metadata indicates that they were captured while the camera was looking up at the subject. For example, image 911, that is retrieved from the diary and shown in the display 910, is the image of a light post when looking up at the light from below.

Figure 10:
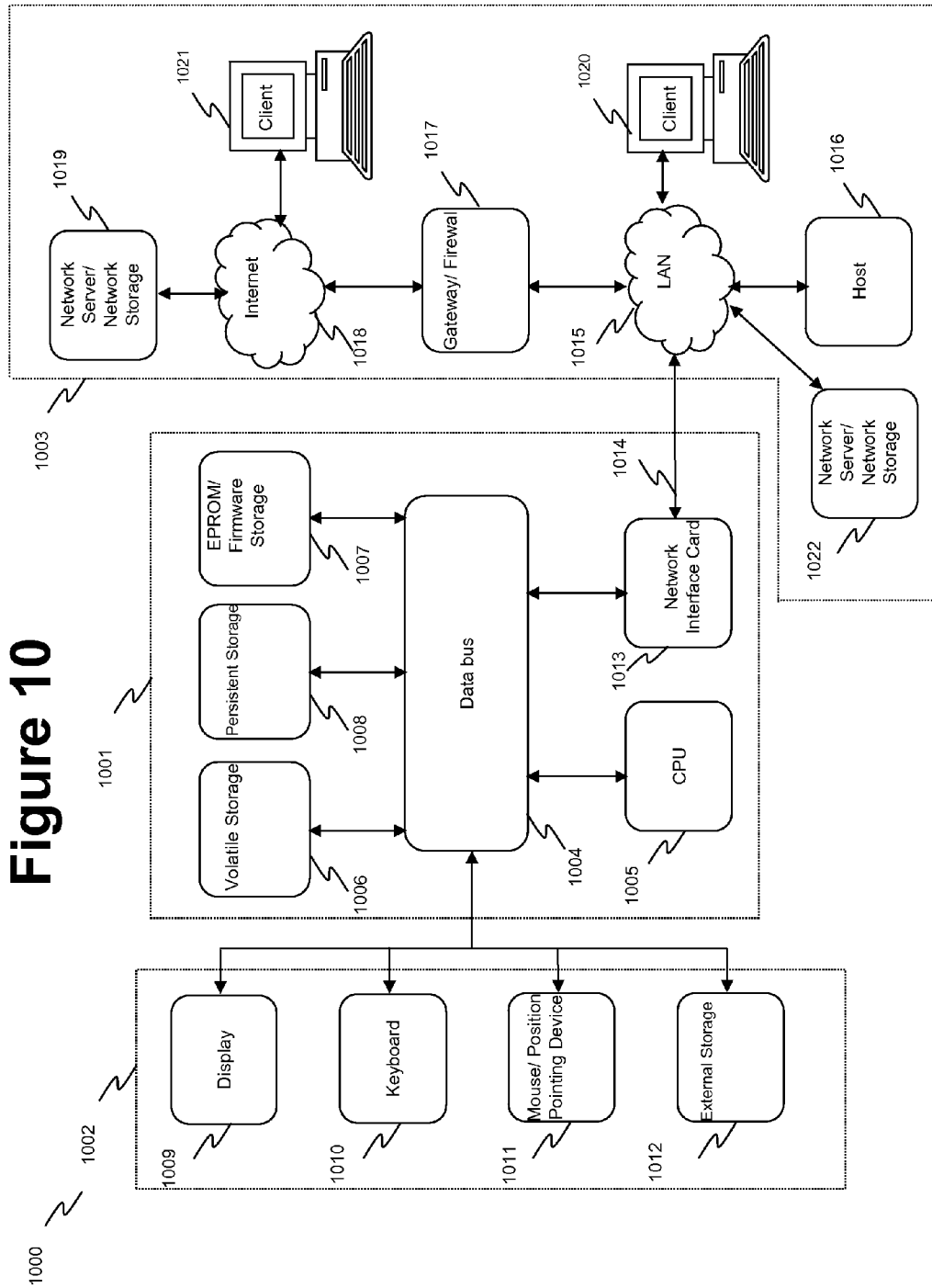
FIG. 10 illustrates an exemplary embodiment of a computer platform upon which the inventive system may be implemented.

FIG. 10 is a block diagram that illustrates an embodiment of a computer/server system 1000 upon which an embodiment of the inventive methodology may be implemented.

The system 1000 includes a computer/server platform 1001, peripheral devices 1002 and network resources 1003.

The computer platform 1001 may include a data bus 1004 or other communication mechanism for communicating information across and among various parts of the computer platform 1001, and a processor 1005 coupled with bus 1001 for processing information and performing other computational and control tasks. Computer platform 1001 also includes a volatile storage 1006, such as a random access memory (RAM) or other dynamic storage device, coupled to bus 1004 for storing various information as well as instructions to be executed by processor 1005. The volatile storage 1006 also may be used for storing temporary variables or other intermediate information during execution of instructions by processor 1005. Computer platform 1001 may further include a read only memory (ROM or EPROM) 1007 or other static storage device coupled to bus 1004 for storing static information and instructions for processor 1005, such as basic input-output system (BIOS), as well as various system configuration parameters. A persistent storage device 1008, such as a magnetic disk, optical disk, or solid-state flash memory device is provided and coupled to bus 1001 for storing information and instructions.

Computer platform 1001 may be coupled via bus 1004 to a display 1009, such as a cathode ray tube (CRT), plasma display, or a liquid crystal display (LCD), for displaying information to a system administrator or user of the computer platform 1001. An input device 1010, including alphanumeric and other keys, is coupled to bus 1001 for communicating information and command selections to processor 1005. Another type of user input device is cursor control device 1011, such as a mouse, a trackball, or cursor direction keys for communicating direction information and command selections to processor 1004 and for controlling cursor movement on display 1009. This input device typically has two degrees of freedom in two axes, a first axis (e.g., x) and a second axis (e.g., y), that allows the device to specify positions in a plane.

An external storage device 1012 may be connected to the computer platform 1001 via bus 1004 to provide an extra or removable storage capacity for the computer platform 1001. In an embodiment of the computer system 1000, the external removable storage device 1012 may be used to facilitate exchange of data with other computer systems.

The invention is related to the use of computer system 1000 for implementing the techniques described herein. In an embodiment, the inventive system may reside on a machine such as computer platform 1001. According to one embodiment of the invention, the techniques described herein are performed by computer system 1000 in response to processor 1005 executing one or more sequences of one or more instructions contained in the volatile memory 1006. Such instructions may be read into volatile memory 1006 from another computer-readable medium, such as persistent storage device 1008. Execution of the sequences of instructions contained in the volatile memory 1006 causes processor 1005 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1005 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 1008. Volatile media includes dynamic memory, such as volatile storage 1006. Transmission media includes coaxial cables, copper wire and fiber optics, including the wires that comprise data bus 1004.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 705 for execution. For example, the instructions may initially be carried on a magnetic disk from a remote computer. Alternatively, a remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on the data bus 1004. The bus 1004 carries the data to the volatile storage 1006, from which processor 1005 retrieves and executes the instructions. The instructions received by the volatile memory 1006 may optionally be stored on persistent storage device 1008 either before or after execution by processor 1005. The instructions may also be downloaded into the computer platform 1001 via Internet using a variety of network data communication protocols well known in the art.

The computer platform 1001 also includes a communication interface, such as network interface card 1013 coupled to the data bus 1004. Communication interface 1013 provides a two-way data communication coupling to a network link 1014 that is connected to a local area network (LAN) 1015. For example, communication interface 1013 may be an integrated services digital network (ISDN) card or a modem to provide a data communication connection to a corresponding type of telephone line. As another example, communication interface 1013 may be a local area network interface card (LAN NIC) to provide a data communication connection to a compatible LAN. Wireless links, such as well-known 1002.11a, 1002.11b, 1002.11g and Bluetooth may also be used for network implementation. In any such implementation, communication interface 1013 sends and receives electrical, electromagnetic or optical signals that carry digital data streams representing various types of information.

Network link 1013 typically provides data communication through one or more networks to other network resources. For example, network link 1014 may provide a connection through LAN 1015 to a host computer 1016, or a network storage/server 1017. Additionally or alternatively, the network link 1013 may connect through gateway/firewall 1017 to the wide-area or global network 1018, such as an Internet. Thus, the computer platform 1001 can access network resources located anywhere on the Internet 1018, such as a remote network storage/server 1019. On the other hand, the computer platform 1001 may also be accessed by clients located anywhere on the LAN 1015 and/or the Internet 1018. The network clients 1020 and 1021 may themselves be implemented based on the computer platform similar to the platform 1001.

The LAN 1015 and the Internet 1018 both use electrical, electromagnetic or optical signals that carry digital data streams. The signals through the various networks and the signals on network link 1014 and through communication interface 1013, which carry the digital data to and from computer platform 1001, are exemplary forms of carrier waves transporting the information.

Computer platform 1001 can send messages and receive data, including program code, through the variety of network(s) including Internet 1018 and LAN 1015, network link 1014 and communication interface 1013. In the Internet example, when the system 1001 acts as a network server, it might transmit a requested code or data for an application program running on client(s) 1020 and/or 1021 through Internet 1018, gateway/firewall 1017, LAN 1015 and communication interface 1013. Similarly, it may receive code from other network resources.

The received code may be executed by processor 1005 as it is received, and/or stored in persistent or volatile storage devices 1008 and 1006, respectively, or other non-volatile storage for later execution. In this manner, computer system 1001 may obtain application code in the form of a carrier wave.

Figure 11:
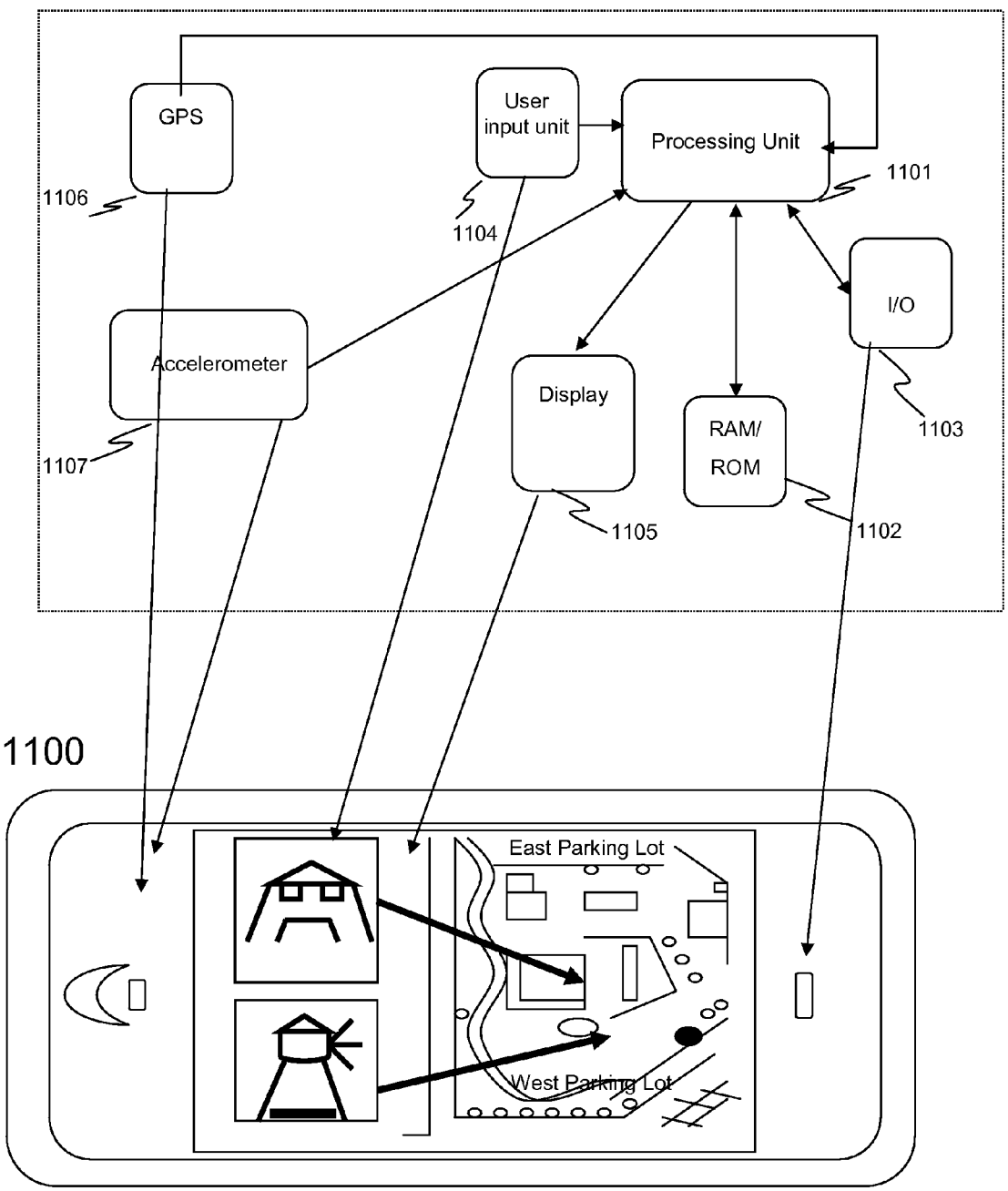
FIG. 11 and FIG. 12 illustrate exemplary functional diagrams of how the present invention relates to the computer platform.
Figure 12:
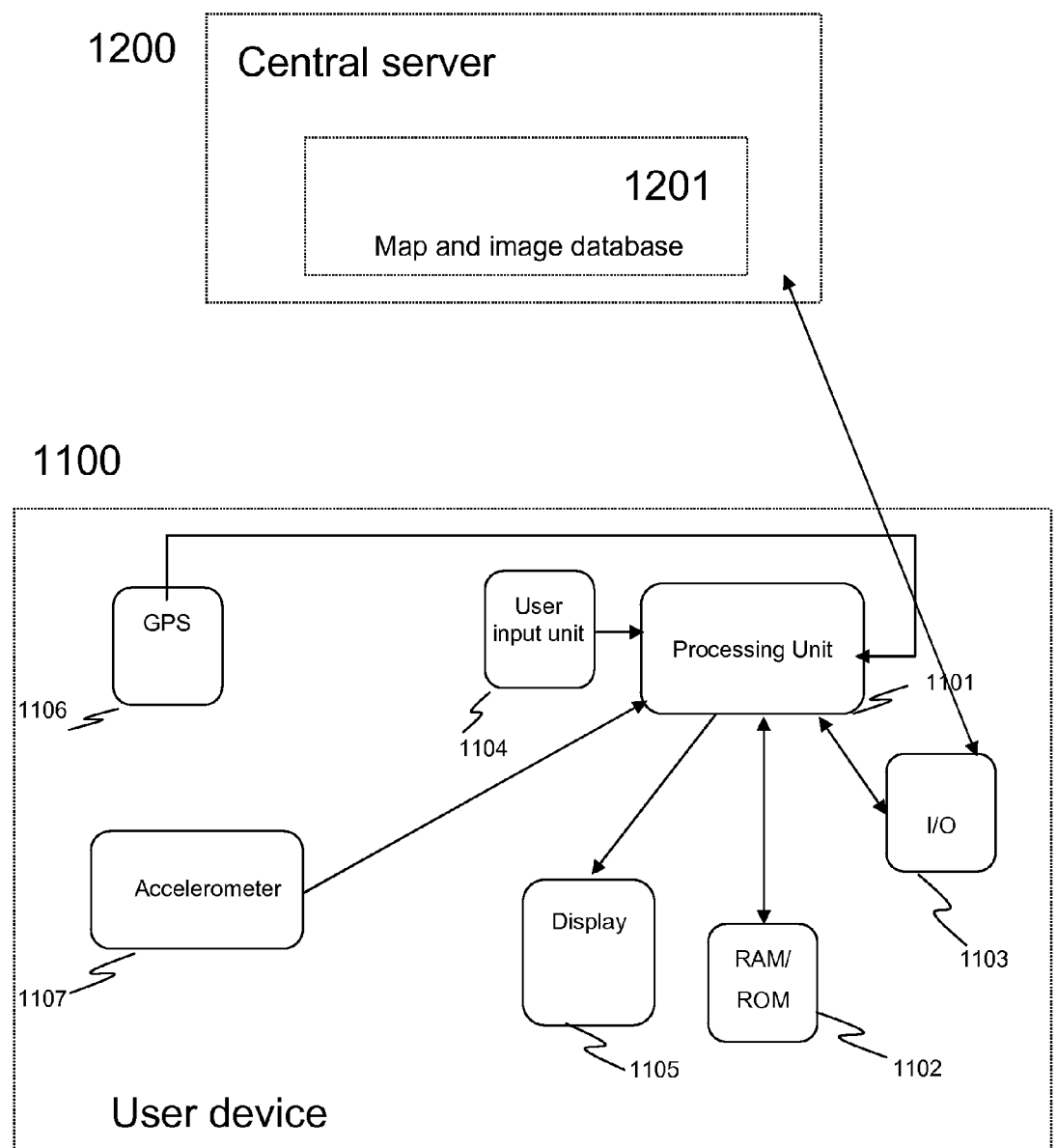

FIG. 11 and FIG. 12 illustrate exemplary functional diagrams of how the present invention relates to the computer platform.

The user device 1100 includes a processing unit 1101 and a RAM/ROM unit 1102 that are used to process the map data and image received by the user device or data sensed by the device or input to the device by the user. The map data may be received from a database 1201 included in a central server 1200. The location and pose data may be sensed by the device or input by the user. An input/output interface 1103 may be used to receive the map and the images and send the collected data to the central server 1200. The input/output interface 1103 may also include a camera for pointing at the desired direction. The user may input his selections or preferences into the device through an additional user input unit 1104 and views the map and the landmarks on the display using a display 1105. A GPS locator 1106 may be used for determining the location of the user device 1100 and an accelerometer 1107 may be used for determining the pose of the user device 1100.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the inventive imaging and navigation system. It is intended that the specification and examples be considered as exemplary only, with a true scope and spirit of the invention being indicated by the following claims and their equivalents.

What is claimed is:

1. A method of accessing an image database, the method comprising:
   receiving image data photographed by a camera;
   receiving camera location data provided by a global position system (GPS) locator and camera orientation data corresponding to the photographed image data, wherein the camera orientation data is an angle of a vector extending along a pointing direction of a camera with respect to a coordinate axis;
   associating, by using a processor, the camera location data and the camera orientation data as associated metadata with corresponding photographed image data;
   forming a database of the photographed image data including the associated metadata;
   receiving an instruction to generate a two-dimensional navigation map of a location of the user, the instruction comprising the location of a user and an orientation of a mobile device of a user at the location;
   determining a viewing direction of the user based on the orientation of the mobile device of the user;
   matching at least one photograph image in the database corresponding to the viewing direction of the user and the location of the user based on the camera location data and the camera orientation data associated with the database of photographed image data;
   generating the two-dimensional navigation map of the location of the user, the two-dimensional navigation map comprising the at least one photograph image; and
   displaying the generated two-dimensional navigation map.

2. The method of claim 1, wherein the photographed image data comprise video images, and
   wherein the associating the camera location data and the camera orientation data as associated metadata comprises deriving a list of time stamped camera location change events and camera orientation change events for each video image and tagging transitions for the video images as the associated metadata.

3. The method of claim 1, wherein the photographed image data comprise picture images, and
   wherein the associating the camera location data and the camera orientation data as associated metadata comprises embedding corresponding ones of the camera location and the camera orientation as header with the picture images as the associated metadata.

4. The method of claim 1, further comprising:
   forming an image diary by associating the camera orientation data, as associated diary metadata, with the photographed image data.

5. The method of claim 4, further comprising:
   receiving a request for an image corresponding to a selected user pose;
   searching the image diary by searching the associated diary metadata; and
   retrieving the photographed image data having the associated diary metadata matching the selected user pose.

6. A method for navigation using a mobile device of a user, the method comprising:
   continuously detecting in real-time mobile device information of the mobile device from a global position system (GPS) locator, the mobile device information comprising a current mobile device location and a current direction of travel of the mobile device;
   receiving an instruction to generate a two-dimensional navigation map from the location of the mobile device to a specified destination;
   generating the two-dimensional map from the location of the mobile device to the specified location, based on the current direction of travel of the mobile device;
   matching at least one photograph image of a database of photograph images associated with a location at which the photograph images are photographed and a camera orientation of a camera capturing the photograph images corresponding to the current direction of travel of the mobile device and the two-dimensional navigation map from the location of the mobile device to the specified location; and
   displaying the at least one image together with the two-dimensional navigation map.

7. The method of claim 6, wherein the photograph images comprise pictures and video clips.

8. The method of claim 6, wherein the at least one photograph image is selected to be a confirmatory matched image, confirming a current location of the mobile device, or an anticipatory matched image, anticipating an upcoming location of the mobile device.

9. The method of claim 6, wherein the map is an interpolated map of a path from the location of the mobile device to the specified location.

10. The method of claim 6, wherein the map is an extrapolated map of a path from the location of the mobile device to the specified location.

11. The method of claim 6, wherein the mobile device information further comprises time data, light data, and user task data, the time data including season data, the light data including overcast condition and night condition, and
   wherein the matching comprises matching the at least one photograph image by further matching the time data, the light data, and the user task data respectively to time of capture, light condition of capture, and task data associated as further metadata with each of the photograph images.

12. The method of claim 11, wherein the user task data is riding a bicycle,
wherein the at least one photograph image was procured by a camera riding on a bicycle along a same path, during a same season, and under similar lighting conditions as the user, and
wherein the at least one photograph image corresponds to an image of interest to a bicyclist.

13. The method of claim 6, wherein the obtaining comprises receiving an input by the user indicating the current mobile device location and the current direction of travel of the mobile device.

14. A database system comprising:
an interface configured to receive image data photographed by a camera and receiving camera location data provided by a global position system (GPS) locator and camera orientation data corresponding to the photographed image;
a processor configured to associate the camera location data and the camera orientation data, as associated metadata with corresponding photographed image data; and
a database configured to store the photographed image data together with the associated metadata,
wherein the interface is further configured to receive user requests comprising a location of a user and an orientation of a mobile device of a user at the location,
wherein the processor is further configured to determine a viewing direction of the user based on the orientation of the mobile device of the user, match at least one photograph image in the database corresponding to the viewing direction of the user and the location of the user based on the camera location data and the camera orientation data associated with the database of photographed image data, generate the two-dimensional navigation map of the location of the user, the two-dimensional navigation map comprising the at least one photograph image, and control display of the generated two-dimensional navigation map.

15. A mobile device for navigation, the mobile device comprising:
a global positioning system module configured to continuously detect in real-time a location of the mobile device;
an accelerometer configured to continuously detect in real-time a direction of travel of the mobile device;
a processor configured to process an instruction to generate a two-dimensional navigation map from the location of the mobile device to a specified destination, generate the two-dimensional navigation map from the location of the mobile device to the specified location, based on the current direction of travel of the mobile device, match at least one photograph image of a database of photograph images associated with a location at which the photograph images are photographed and a camera orientation of a camera capturing the photograph images corresponding to the current direction of travel of the mobile device and the map from the location of the mobile device to the specified location; and
a display configured to display the at least one photograph image together with the two-dimensional navigation map.

* * * * *